UNITED STATES PATENT OFFICE.

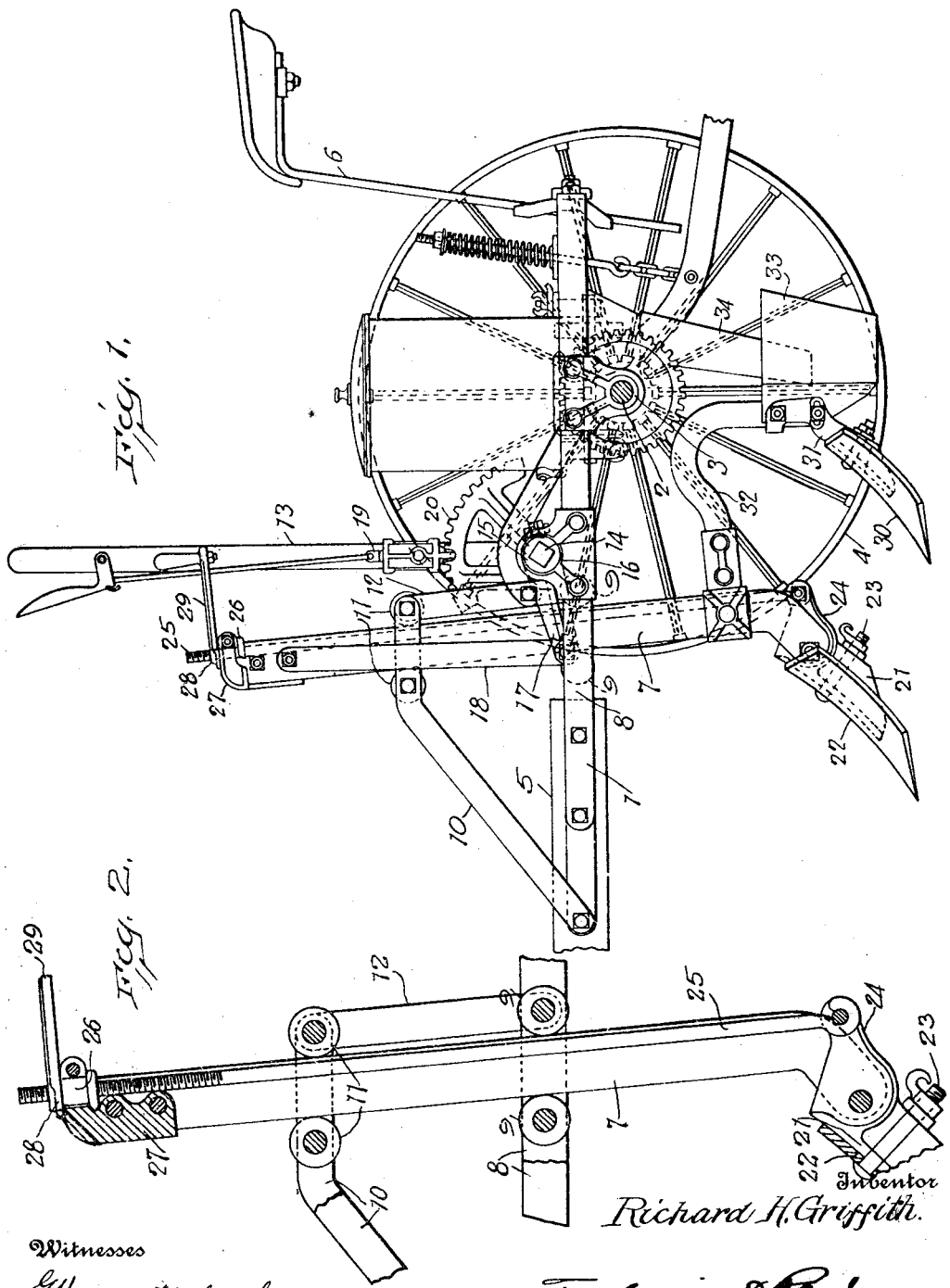

RICHARD H. GRIFFITH, OF BELLEVUE, OHIO, ASSIGNOR TO THE OHIO CULTIVATOR COMPANY, OF BELLEVUE, OHIO, A CORPORATION OF OHIO.

PLANTER.

1,039,275. Specification of Letters Patent. Patented Sept. 24, 1912.

Original application filed October 10, 1910, Serial No. 586,181. Divided and this application filed August 14, 1911. Serial No. 643,859.

*To all whom it may concern:*

Be it known that I, RICHARD H. GRIFFITH, a citizen of the United States, residing at Bellevue, in the county of Huron and State of Ohio, have invented certain new and useful Improvements in Planters, of which the following is a specification, reference being had therein to the accompanying drawing.
The present invention is a division of an application filed by me October 10, 1910, Serial No. 586,181 and relates to planters and more particularly to supports for furrow-opening shovels for planters of various kinds.

The object of the invention is to provide an adjustable support for a furrow-opening shovel which will permit the shovel to be adjusted to various angles; and further, to provide a device of this character which will be of a very simple easily operated construction and which will enable a very fine adjustment of the shovel to be secured.

Further, it is an object of the invention to mount on the support for the furrow-opening shovel a sub-soiling shovel and to provide means for actuating said support to raise and lower the furrow-opening shovel and the sub-soiler simultaneously without affecting the angular adjustment of the furrow-opening shovel.

In the accompanying drawings, Figure 1 is a side elevation of a portion of a planter showing my invention applied thereto; and Fig. 2 is a vertical, sectional view taken through the shovel support and showing the adjusting mechanism in elevation.

In these drawings I have illustrated one embodiment of my invention and have shown the same as applied to a planter comprising a main frame 1 having an axle 2 journaled in bearings 3 carried by said main frame. Ground wheels 4 are mounted on said axle and are preferably rigidly secured thereto. Connected to the forward portion of the main frame is a pole or tongue 5 and a seat 6 is mounted on the rear portion of said frame. Arranged near the forward end of the main frame is a vertically adjustable furrow opener, which, as here shown, comprises a substantially vertical shank 7 which preferably consists of two members rigidly connected one to the other and arranged between two longi-
tudinal guide bars 8 rigidly secured at their
opposite ends to and forming a part of the main frame. These bars have rollers 9 mounted between them and spaced apart a distance sufficient to receive the shank 7, thus constituting a guide which effectually prevents any movement of the shank other than a vertical movement. The shank is also further guided at a point above the main frame, this being accomplished, in the present instance, by two guide bars 10 spaced apart to receive the shank and having rollers 11 to engage the front and rear edges thereof after the manner of the rollers 9. The forward ends of the guide bars 10 extend downwardly and forwardly and are rigidly secured to the main frame. The rear portions of these bars are connected to the main frame by means of brace bars 12 extending downwardly and laterally therefrom. Vertical movement may be imparted to the shank 7 in any suitable manner, but this is preferably accomplished by means of an operating member, such as a lever 13 which is rigidly secured to one end of a shaft 14. This shaft is here shown as a square shaft and is mounted in bushings 15 which are journaled in bearings 16 carried by the main frame. Rigidly secured to the shaft 14 and extending forwardly therefrom are two arms 17 arranged one on each side of the shank 7 and connected thereto by means of links 18. Consequently, the movement of the lever 13 and the rotation of the shaft 14 will raise or lower the shank, according to the direction of movement of the lever. The lever is preferably provided with the usual spring-pressed dog 19 adapted to coöperate with a toothed segment 20 to retain the handle in adjusted positions.

The furrow-opening shovel may be secured to the lower end of the shank in any approved manner, but I prefer to provide means for so connecting the shovel to the shank that it can, at the will of the operator, be adjusted to different angles to the ground line, and further to provide means by which shovels of different styles may be operatively connected to the shank. Both of these results are accomplished by pivotally connecting a supporting member 21 to the lower end of the shank on a transverse axis and providing means under the control of the operator for moving the supporting member about its pivotal center. A shovel 22 may be secured to this support in any suitable manner, this being accomplished, in the present instance, by means of a bolt 23. In the construction here shown the shovel-supporting member 21 is arranged between the two members comprising the shank 7 and has a rearwardly extending projection or arm 24 to which is pivotally connected the lower end of a rod 25 which extends upwardly and has its upper end extending through and guided by a bushing 26 carried by a bracket 27 rigidly secured to the upper end of the two members of the shank and constituting a part of the shank. The upper end of the rod is screw-threaded and has mounted thereon a nut 28 which bears upon the upper end of the bushing 26 and controls the movement of the rod 25, and, consequently, the movement of the support and its shovel. The nut is preferably provided with a handle 29 to facilitate its movement and the adjustment of the shovel. By this means the shovel can be readily adjusted by the operator, and, owing to the use of the nut on the screw-threaded bolt to accomplish this adjustment, the parts will be locked in their adjusted positions as soon as the movement of the nut ceases. By so adjusting the support the shovel carried thereby can be caused to extend at various angles to the ground line and may thus be accommodated to varying soil conditions. Further, this adjustment of the support permits shovels of different styles to be mounted thereon and supported at the proper angle to the ground line.

Arranged in the rear of the furrow opener and operatively connected with the lever 13 is a sub-soiler. This preferably comprises a shovel 30, somewhat smaller in size than the furrow-opening shovel, mounted on a support 31 carried by an arm 32 which extends upwardly and thence forwardly and is rigidly secured at its forward end to the shank 7 of the furrow opener. Rigidly secured to the upwardly extending portion of the arm 32 is a shield 33 which surrounds the lower end of the grain spout 34. In this manner the furrow opener, sub-soiler and shield are caused to move in unison by the operation of the lever 13.

The manner of feeding the grain to the grain spout and the manner of covering the same form no part of the present invention and are, therefore, not shown or described in detail in the present application, it being obvious that the controlling devices for the furrow opener and sub-soiler can be utilized in connection with various forms of planting mechanism.

It will be apparent from the foregoing description of the mechanism that the operation of the controlling lever will simultaneously elevate the furrow-opening shovel and the sub-soiler, and further, that the angle at which the furrow-opening shovel engages the ground may be quickly and easily adjusted by the manipulation of the handle 29; that, owing to the screw-threaded connection between the handle and the adjusting rod no locking means is necessary as the handle will be retained automatically in the position in which it stops.

I wish it to be understood that while I have shown and described one form of my invention, this is chosen for the purpose of illustration only and I do not wish to be limited to the details of construction shown and described, for obvious modifications will occur to one skilled in the art.

Having thus fully described my invention, what I claim as new and desire to secure by Letters Patent, is:—

1. A planter comprising a frame, ground wheels therefor, a vertically adjustable shank carried by said frame, a shovel support mounted on said shank and adjustable to support said shovel at different angles to the ground line, and an adjusting device connected with said shovel support, extending above said frame and capable of movement with and independently of said shank.

2. A planter comprising a frame, ground wheels therefor, a vertically adjustable shank carried by said frame and consisting of two members spaced apart, a shovel support mounted on said shank and adjustable to support said shovel at different angles to the ground line, an adjusting device connected with said shovel, extending upwardly therefrom between said shank members and movable with and independently of said shank, means at the top of said shank for operating said adjusting device, and guides for said shank.

In testimony whereof, I affix my signature in presence of two witnesses.

RICHARD H. GRIFFITH.

Witnesses:
E. H. ERDRICH,
E. A. KEMP.